(12) United States Patent
Lou et al.

(10) Patent No.: US 12,450,730 B2
(45) Date of Patent: Oct. 21, 2025

(54) MULTIMODAL ANALYSIS OF IMAGING AND CLINICAL DATA FOR PERSONALIZED THERAPY

(71) Applicants: SIEMENS HEALTHINEERS AG, Forchheim (DE); City of Hope National Medical Center, Duarte, CA (US)

(72) Inventors: Bin Lou, Princeton, NJ (US); Ali Kamen, Skillman, NJ (US); Ammar Chaudhry, Yorba Linda, CA (US)

(73) Assignees: Siemens Healthineers AG, Forchheim (DE); City of Hope National Medical Center, Duarte, CA (US)

( * ) Notice: Subject to any disclaimer, the term of this patent is extended or adjusted under 35 U.S.C. 154(b) by 455 days.

(21) Appl. No.: 17/449,472

(22) Filed: Sep. 30, 2021

(65) Prior Publication Data

US 2023/0097895 A1    Mar. 30, 2023

(51) Int. Cl.
*G06T 7/00* (2017.01)
*G06N 3/045* (2023.01)
(Continued)

(52) U.S. Cl.
CPC .......... *G06T 7/0012* (2013.01); *G06N 3/045* (2023.01); *G06T 7/11* (2017.01); *G06T 7/62* (2017.01);
(Continued)

(58) Field of Classification Search
CPC ..... A61B 5/0042; A61B 5/055; A61B 5/4064; A61B 5/7267; G06N 3/045; G06T 2207/10088; G06T 2207/20081; G06T 2207/20084; G06T 2207/30016; G06T 2207/30096; G06T 7/0012; G06T 7/11; G06T 7/62; G16H 30/40; G16H 50/20; G16H 50/70
See application file for complete search history.

(56) References Cited

U.S. PATENT DOCUMENTS

| 2015/0356730 A1* | 12/2015 | Grove | G06T 7/64 |
| | | | 382/124 |
| 2016/0129282 A1* | 5/2016 | Yin | G16H 40/20 |
| | | | 600/1 |

(Continued)

FOREIGN PATENT DOCUMENTS

| CA | 3168136 A1 * | 9/2021 | ........... G06T 7/0012 |
| EP | 3588378 A1 * | 1/2020 | ........... A61B 5/7485 |

(Continued)

OTHER PUBLICATIONS

Extended European Search Report (EESR) mailed Feb. 8, 2023 in corresponding European Patent Application No. 22198448.7.
(Continued)

*Primary Examiner* — Zhiyu Lu (57) ABSTRACT

Systems and methods for predicting clinical outcomes of a patient are provided. An input medical image of a tumor of a patient is received. The tumor is segmented from the input medical image. One or more assessments of the tumor are performed based on the segmentation. A clinical outcome of the patient is predicted based on results of the one or more assessments of the tumor. The clinical outcome of the patient is output.

15 Claims, 7 Drawing Sheets

(51) Int. Cl.
- *G06T 7/11* (2017.01)
- *G06T 7/62* (2017.01)
- *G16H 30/40* (2018.01)
- *G16H 50/20* (2018.01)

(52) U.S. Cl.
CPC ............ *G16H 30/40* (2018.01); *G16H 50/20* (2018.01); *G06T 2207/10088* (2013.01); *G06T 2207/20081* (2013.01); *G06T 2207/20084* (2013.01); *G06T 2207/30016* (2013.01); *G06T 2207/30096* (2013.01)

(56) References Cited

U.S. PATENT DOCUMENTS

| | | | | |
|---|---|---|---|---|
| 2019/0005649 | A1* | 1/2019 | Gering | A61B 6/463 |
| 2019/0371450 | A1 | 12/2019 | Lou et al. | |
| 2020/0005461 | A1* | 1/2020 | Yip | A61B 5/725 |
| 2020/0020098 | A1* | 1/2020 | Odry | G06N 3/045 |
| 2020/0069973 | A1* | 3/2020 | Lou | G16H 30/20 |
| 2020/0105399 | A1* | 4/2020 | Laaksonen | G06N 3/08 |
| 2020/0108276 | A1* | 4/2020 | Yin | G16H 40/20 |
| 2020/0258223 | A1* | 8/2020 | Yip | G06V 10/82 |
| 2021/0169349 | A1* | 6/2021 | Madabhushi | A61B 5/7275 |
| 2021/0383538 | A1* | 12/2021 | Deasy | A61B 6/5211 |
| 2022/0170909 | A1* | 6/2022 | Schabath | G01N 33/6827 |
| 2022/0284643 | A1* | 9/2022 | Jha | G06T 11/005 |
| 2023/0011970 | A1* | 1/2023 | Serra Lleti | G16B 40/20 |

FOREIGN PATENT DOCUMENTS

| | | | | |
|---|---|---|---|---|
| WO | WO-2021211787 | A1 * | 10/2021 | A61B 5/055 |
| WO | WO-2022203660 | A1 * | 9/2022 | G06V 10/82 |

OTHER PUBLICATIONS

Afshar Parnian et al: "From Handcrafted to Deep-Learning-Based Cancer Radiomics: Challenges and opportunities", IEEE Signal Processing Magazine, IEEE, USA, vol. 36, No. 4, Jul. 1, 2019, pp. 132-160.

Bhandari Abhishta et al: "Convolutional neural networks for brain tumour segmentation" Insights Into Imaging, vol. 11, No. 1, Dec. 1, 2020, pp. 1-9, XP055866852, Retrieved from the Internet.

* cited by examiner

MULTIMODAL ANALYSIS OF IMAGING AND CLINICAL DATA FOR PERSONALIZED THERAPY

TECHNICAL FIELD

The present invention relates generally to multimodal analysis of imaging and clinical data for personalized therapy, and in particular to baseline and longitudinal multimodal analysis of imaging and clinical data for personalized therapy.

BACKGROUND

GBM (glioblastoma) is an incurable form of brain cancer. The efficacy of GBM therapies is hindered by suboptimal evaluation of GBM heterogeneity in standard-of-care invasive and non-invasive diagnostic procedures. For invasive diagnostic procedures of GBM, a biopsy is performed on a tumor on the brain. However, it is not feasible to perform whole-tumor biopsies to assess GBM heterogeneity prior to the start of treatment due to the risks associated with brain biopsies. Therefore, GBM heterogeneity must be assessed through non-invasive techniques. One non-invasive technique for the assessment of GBM heterogeneity is RANO (response assessment in neuro-oncology), which uses MRI (magnetic resonance imaging) to assess treatment response. However, RANO cannot account for tumor heterogeneity or traits that emerge during treatment.

BRIEF SUMMARY OF THE INVENTION

In accordance with one or more embodiments, systems and methods for predicting clinical outcomes of a patient are provided, for example, for the assessment of GBM. An input medical image of a tumor of a patient is received. The tumor is segmented from the input medical image. One or more assessments of the tumor are performed based on the segmentation. A clinical outcome of the patient is predicted based on results of the one or more assessments of the tumor. The clinical outcome of the patient is output.

In one embodiment, the one or more assessments of the tumor are performed by performing a volumetric analysis of the tumor by computing a volume of the segmented tumor and performing a radiomic analysis of the tumor by extracting radiomic features of the tumor from the input medical image. The radiomic features may comprise one or more of tumor intensity, tumor shape, or tumor texture.

In one embodiment, the segmenting of the tumor from the input medical image and the predicting of the clinical outcome of the patient are jointly performed by a trained machine learning based network.

In one embodiment, the clinical outcome of the patient is predicted based on the results of the one or more assessments of the tumor and historical clinical data. The clinical outcome may comprise one or more of a response to a treatment of the tumor or a survival prognosis of the patient.

In one embodiment, the input medical image is encoded into latent features representing tumor and normal tissue in the input medical image using an encoder network. The tumor is segmented from the input medical image by decoding the latent features to generate a segmentation map of the tumor using a first decoder network. The one or more assessments of the tumor are performed by decoding the latent features to extract radiomic features of the tumor using a second decoder network. The clinical outcome of the patient is predicted by decoding the latent features to predict the clinical outcome using a third decoder network.

In one embodiment, one or more additional input medical images of the patient are received. The input medical image and the one or more additional input medical images are acquired at different timepoints. The input medical image and the one or more additional input medical images are encoded into latent features using an encoder network. An assessment of tumor progression is determined based on the latent features using a machine learning based progression classification network.

In one embodiment, the input medical image comprises an mpMRI (multi-parametric magnetic resonance imaging) image of a brain of the patient.

These and other advantages of the invention will be apparent to those of ordinary skill in the art by reference to the following detailed description and the accompanying drawings.

DETAILED DESCRIPTION

The present invention generally relates to methods and systems for baseline and longitudinal multimodal analysis of imaging and clinical data for personalized therapy. Embodiments of the present invention are described herein to give a visual understanding of such methods and systems. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, is to be understood that embodiments of the present invention may be performed within a computer system using data stored within the computer system.

Embodiments described herein provide for a real-time point-of-care radiogenomic platform—GAMBIT (glioma auto-AI measurement baseline interpretation and tracking). GAMBIT integrates imaging and clinical data using machine learning and deep learning to automatically predict clinical outcomes of a patient with a brain tumor to provide a novel point-of-care clinical imaging tool. GAMBIT non-invasively provides detailed evaluation of GBM characteristics in pretreatment settings and longitudinally during treatment. GAMBIT may be integrated in the clinical workflow by automating tumor assessment (e.g., volume and radiomic feature extraction) and integrating the assessment at scale in the clinical workflow. In addition, GAMBIT may be utilized to determine biological underpinnings of whether classes of GBM variables (e.g., tumor volume, radiomics, biology) are tautological (redundant), orthogonal (complementary), or somewhere in between. Advantageously, providing users (e.g., clinicians) with the ability to comprehensively capture the quantized measures of GBM complex (e.g., TSP (thrombospondin) and TME (tumor micro-environment)) in its entirety facilitates user understanding and acceptance.

Figure 1:
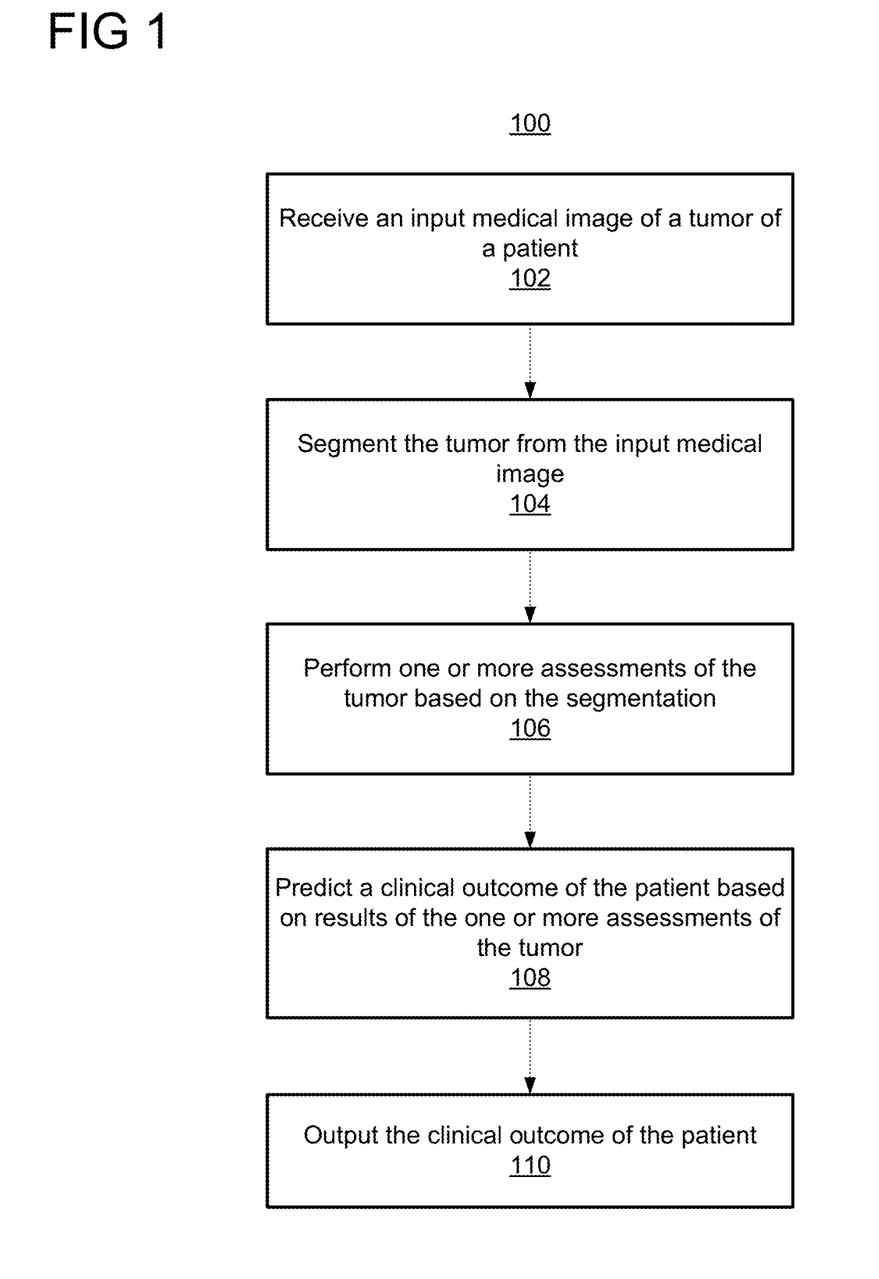
FIG. 1 shows a method for predicting a clinical outcome of a patient for a tumor, in accordance with one or more embodiments.
Figure 2:
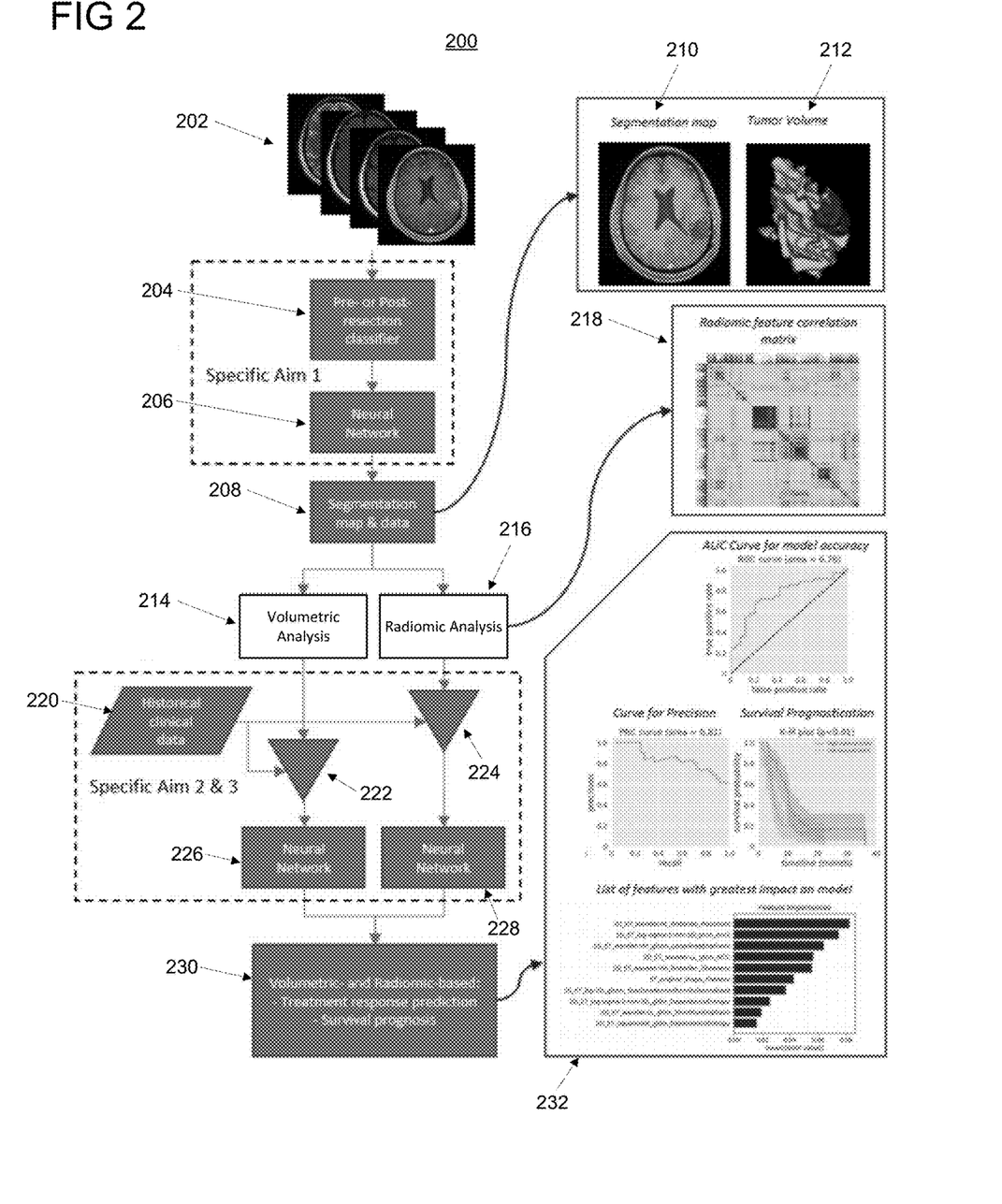
FIG. 2 shows a workflow for predicting a clinical outcome of a patient for a tumor, in accordance with one or more embodiments.

FIG. 1 shows a method 100 for predicting a clinical outcome of a patient for a tumor, in accordance with one or more embodiments. The steps of method 100 may be performed by one or more suitable computing devices, such as, e.g., computer 702 of FIG. 7. FIG. 2 shows a workflow 200 for predicting a clinical outcome of a patient for a tumor, in accordance with one or more embodiments. FIGS. 1 and 2 will be described together. GAMBIT may be implemented in accordance with method 100 of FIG. 1 and workflow 200 of FIG. 2.

At step 102 of FIG. 1, an input medical image of a tumor of a patient is received. As used herein, a tumor refers to any abnormality of the patient (e.g., a lesion, etc.). In one example, the input medical image depicts a brain tumor on a brain of the patient. However, the input medical image may depict a tumor on any other suitable anatomical object of interest of the patient.

In one embodiment, the input medical image is an mpMRI (multi-parametric magnetic resonance imaging) image. For example, the input medical image may be the mpMRI images 202 of FIG. 2. However, the input medical image may be of any other suitable modality, such as, e.g., CT (computed tomography), ultrasound, x-ray, or any other medical imaging modality or combinations of medical imaging modalities. The input medical image may comprise 2D (two dimensional) images and/or 3D (three dimensional) volumes, and may comprise a single input medical image or a plurality of input medical images. The input medical image may be received directly from an image acquisition device, such as, e.g., a CT scanner, as the input medical image is acquired, or can be received by loading previously acquired medical images from a storage or memory of a computer system (e.g., a PACS (picture archiving and communication system)) or receiving medical images that have been transmitted from a remote computer system. It should be understood that reference herein to pixels of 2D images equally refer to voxels of 3D volumes (and vice versa).

At step 104 of FIG. 1, the tumor is segmented from the input medical image. In image segmentation, a portion of the image corresponding to an object of interest (a tumor in this embodiment) is partitioned from the remaining portions of the image. The result of the segmentation is a segmentation map. The segmentation map defines a pixel-wise probability that a respective pixel depicts the tumor. In one embodiment, the tumor is segmented from the input medical image using a trained machine learning based network, as described in further detail below with respect to FIG. 3. However, the tumor may be segmented from the input medical image using any other suitable approach.

In one example, as shown in FIG. 2, a classifier 204 is applied to classify mpMRI images 202 as being pre-resection or post-resection and the pre-resection mpMRI images are input into neural network 206 to segment the tumor from the pre-resection mpMRI images. The segmented tumors are represented as segmentation map and data 208, which comprises segmentation map 210. The generation of segmentation map and data 208 enables the accurate measurement of the tumor, which is denoted in FIG. 2 as specific aim 1.

At step 106 of FIG. 1, one or more assessments of the tumor are performed based on the segmentation. In one embodiment, the assessments of the tumor comprise two separate tracks of analyses: volumetric analysis of the tumor and radiomic analysis of the tumor. For example, as shown in FIG. 2, volumetric analysis 214 and radiomic analysis 216 of the tumor is performed based on segmentation map and data 208 to generate tumor volume 212 and radiomic feature correlation matrix 218 respectively. Volumetric analysis 214 of the tumor is performed by computing a volume of the segmented tumor. Radiomic analysis 216 is performed by extracting radiomic features of the tumor from the input medical image based on the segmentation. Radiomic features of the tumors refers to characteristics of the tumor, such as, e.g., tumor intensity, tumor shape, tumor texture, etc. The radiomic features may be correlated in radiomic feature correlation matrix 218. In one embodiment, the radiomic features may be extracted from the input medical image using a trained machine learning based network, as described in further detail below with respect to FIG. 3. In another embodiment, the radiomic features are manually extracted from the input medical image by a user (e.g., a clinician). The radiomic features may be extracted from the input medical image using any other suitable approach. Other types of assessments of the tumor are also contemplated.

At step 108 of FIG. 1, a clinical outcome of the patient is predicted based on results of the one or more assessments of the tumor. The clinical outcome may include, for example, a response to treatment of the tumor, a survival prognosis, or any other clinical outcome of the patient. In one embodiment, the clinical outcome is predicted using a machine learning based network, as described in further detail below with respect to FIG. 3. For example, as shown in FIG. 2, results of volumetric analysis 214 and radiomic analysis 216 are respectively combined with historical clinical data 220 by combiners 222 and 224. Historical clinical data 220 may comprise, for example, clinical, molecular, and other metrics or data of the patient. The combined data are respectively input into neural networks 226 and 228, which generate as output volumetric- and radiomic-based clinical outcomes 230. The volumetric- and radiomic-based clinical outcomes 230 may comprise a treatment response prediction or a survival prognosis. For example, volumetric- and radiomic-based clinical outcomes 230 may comprise outputs 232, such as AUC (area under the curve) model accuracy, PRC (precision recall curve) for precision, survival prognostication, and a list of features with the greatest impact on the model. The radiomic analysis 216 enables the extraction of radiomic features from the input medical image and neural networks 226 and 228 enable prediction of patient outcomes, which are respectively denoted in FIG. 2 as specific aims 2 and 3.

At step 110, the clinical outcome of the patient is output. For example, the clinical outcome of the patient can be output by displaying the clinical outcome of the patient on a display device of a computer system, storing the clinical outcome of the patient on a memory or storage of a computer system, or by transmitting the clinical outcome of the patient to a remote computer system.

Figure 3:
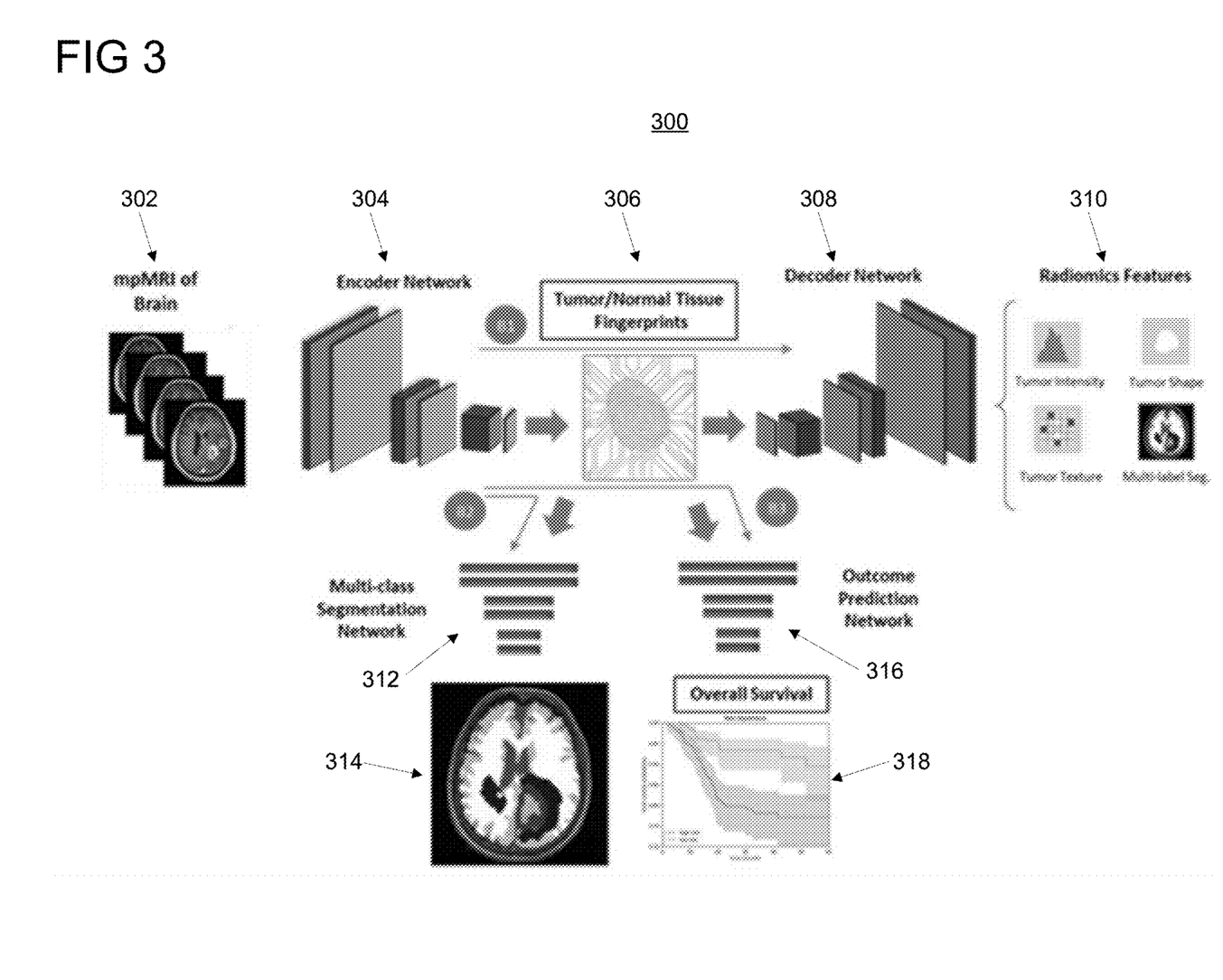
FIG. 3 shows a network architecture for implementing a multi-class segmentation network, an outcome prediction network, and a radiomics features extraction network, in accordance with one or more embodiments.

FIG. 3 shows a network architecture 300 for implementing a multi-class segmentation network, an outcome prediction network, and a radiomics features extraction network, in accordance with one or more embodiments. The multi-class segmentation network, the outcome prediction network, and the radiomics features extraction network in accordance with network architecture 300 may be the machine learning based networks applied to perform steps 104, 108, and 106, respectively.

The multi-class segmentation network, the outcome prediction network, and the radiomics features extraction network are implemented using a single encoder network 304 with respective decoder networks 312, 316, and 308. Encoder network 304 receives as input mpMRI images 302 of the brain of a patient and encodes mpMRI images 302 into fingerprints 306. Fingerprints 306 represent latent features of tumor and normal tissue in mpMRI images 302. Decoder network 308 of radiomics features extraction network decodes fingerprints 306 to extract radiomic features 310 of the tumor, such as, e.g., tumor intensity, tumor shape, tumor texture, and multi-label segmentation. Decoder network 312 of multi-class segmentation network decodes fingerprints 306 to generate a segmentation map 314 of the tumor. Decoder network 316 of outcome prediction network decodes fingerprints 306 to generate an overall survival prognosis 318.

In one embodiment, decoder network 312 and decoder network 316 are implemented as a single decoder network trained with multi-task learning to perform both multi-class segmentation and outcome prediction. In this manner, the single decoder network jointly and simultaneously performs the multi-class segmentation and the outcome prediction. Advantageously, by training the single decoder network to perform both multi-class segmentation and outcome prediction, the single decoder network utilizes common features for improved performance in multi-class segmentation and outcome prediction.

The multi-class segmentation network, the outcome prediction network, and the radiomics features extraction network (implemented by encoder network 304 and respective decoder network 312, 316, and 308) are trained during a prior training or offline stage. In one embodiment, the multi-class segmentation network, the outcome prediction network, and the radiomics features extraction network are jointly trained. The radiomics features extraction network may be trained to be as regularized as possible. Once trained, the trained multi-class segmentation network, outcome prediction network, and radiomics features extraction network are applied during an online or inference stage. In one example, the trained multi-class segmentation network is applied to perform step 104 of FIG. 1, the trained outcome prediction network is applied to perform step 108 of FIG. 1, and the trained radiomics features extraction network is applied to perform radiomic feature extraction at step 106 of FIG. 1.

Figure 4:
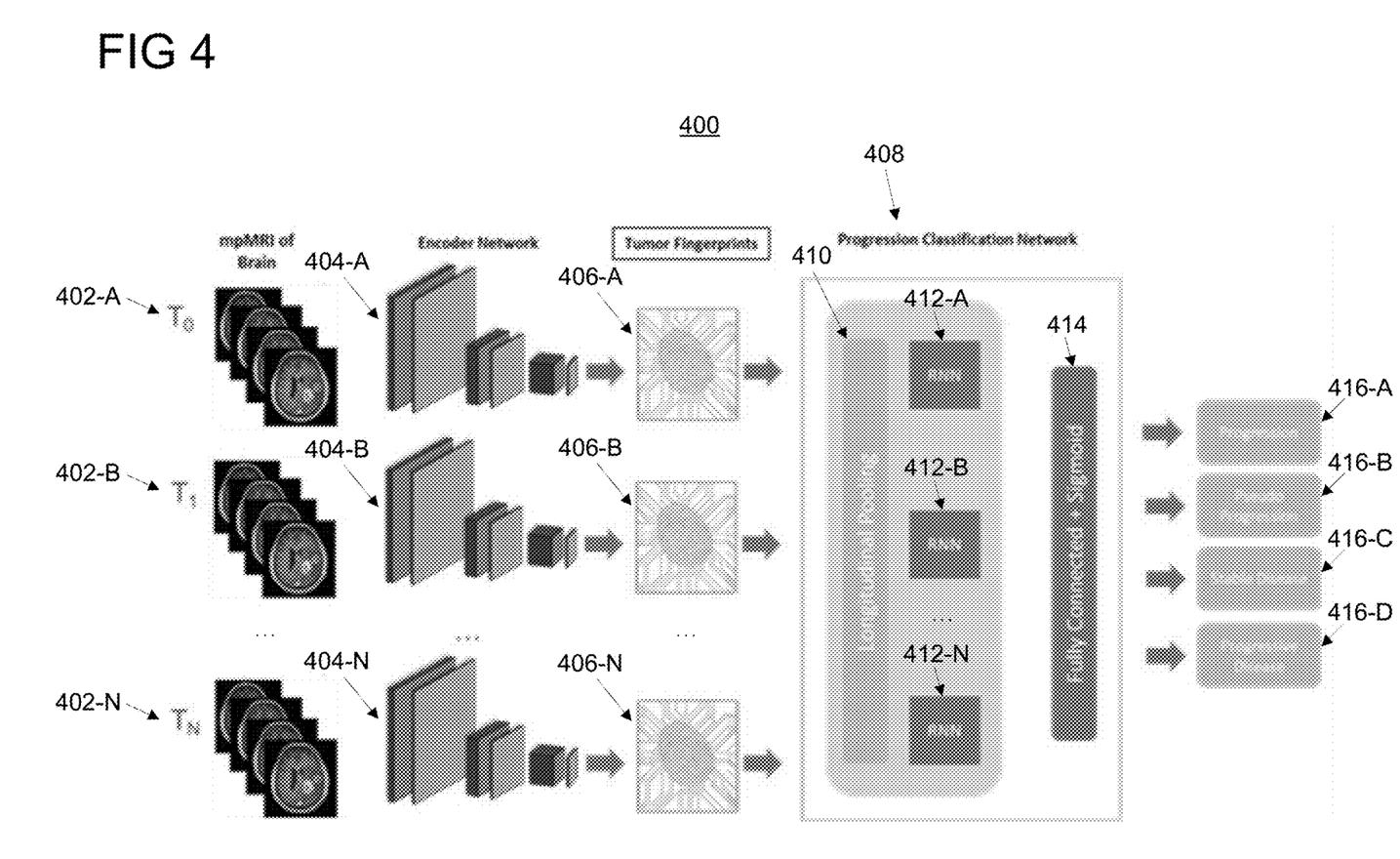
FIG. 4 shows a workflow for longitudinal analysis of input medical images to assess the input medical images over time, in accordance with one or more embodiments.

FIG. 4 shows a workflow 400 for longitudinal analysis of input medical images to assess the input medical images over time, in accordance with one or more embodiments. In workflow 400, mpMRI images 402-A, 402-B, . . . , 402-N (collectively referred to as mpMRI images 400) of a brain of a patient are acquired at different respective timepoints $T_0$, $T_1$, . . . , $T_N$, where N may be any positive integer. In one example, mpMRI image 402-A is a baseline image acquired during a planning stage and mpMRI images 402-B-402-N are longitudinal images acquired during therapy. mpMRI images 402 are respectively encoded by encoder networks 404-A, 404-B, . . . 404-N (collectively referred to as encoder network 404) into tumor fingerprints 406-A, 406-B, . . . 406-N (collectively referred to as tumor fingerprints 406). While encoder networks 404 are separately shown in FIG. 4 to illustrate the analysis of mpMRI images 402 in workflow 400, it should be understood that encoder networks 404 are the same encoder network applied to the different mpMRI images 402. In one example, encoder networks 404 is encoder network 304 of FIG. 3.

Tumor fingerprints 406 are input into a machine learning based progression classification network 408. In one embodiment, progression classification network 408 is implemented with longitudinal pooling 410, RNNs (recurrent neural networks) 412-A, 412-B, . . . , 412-C (collectively referred to as RNNs 412), and fully connected and sigmoid layer 414. Longitudinal pooling 410 stores tumor fingerprints 406, which are respectively input into RNNs 412. The outputs of RNNs 412 are input into fully connected and sigmoid layer 414. Other configurations of progression classification network 408 are also contemplated. The output of progression classification network 408 is an assessment of tumor progression. In one example, the assessment is a classification of tumor progression as being one of progression 416-A, pseudo progression 416-B, stable disease 416-C, and progressive disease 416-D. In one example, the assessment is of a tumor while the patient undergoes therapy. Accordingly, in one embodiment, the assessment output by progression classification network 408 may be compared with an actual patient response to therapy (e.g., assessed by a clinician or other user) to evaluate the response of the patient to the therapy (e.g., to evaluate whether the actual patient response is ahead, behind, or as expected for an expected patient response as predicted by progression classification network 408).

Embodiments described herein are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the providing system.

Furthermore, certain embodiments described herein are described with respect to methods and systems utilizing trained machine learning based networks (or models), as well as with respect to methods and systems for training machine learning based networks. Features, advantages or alternative embodiments herein can be assigned to the other claimed objects and vice versa. In other words, claims for methods and systems for training a machine learning based network can be improved with features described or claimed in context of the methods and systems for utilizing a trained machine learning based network, and vice versa.

In particular, the trained machine learning based networks applied in embodiments described herein can be adapted by the methods and systems for training the machine learning based networks. Furthermore, the input data of the trained machine learning based network can comprise advantageous features and embodiments of the training input data, and vice versa. Furthermore, the output data of the trained machine learning based network can comprise advantageous features and embodiments of the output training data, and vice versa.

In general, a trained machine learning based network mimics cognitive functions that humans associate with other human minds. In particular, by training based on training data, the trained machine learning based network is able to adapt to new circumstances and to detect and extrapolate patterns.

In general, parameters of a machine learning based network can be adapted by means of training. In particular, supervised training, semi-supervised training, unsupervised training, reinforcement learning and/or active learning can be used. Furthermore, representation learning (an alternative term is "feature learning") can be used. In particular, the parameters of the trained machine learning based network can be adapted iteratively by several steps of training.

In particular, a trained machine learning based network can comprise a neural network, a support vector machine, a decision tree, and/or a Bayesian network, and/or the trained machine learning based network can be based on k-means clustering, Q-learning, genetic algorithms, and/or association rules. In particular, a neural network can be a deep neural network, a convolutional neural network, or a convolutional deep neural network. Furthermore, a neural network can be an adversarial network, a deep adversarial network and/or a generative adversarial network.

Figure 5:
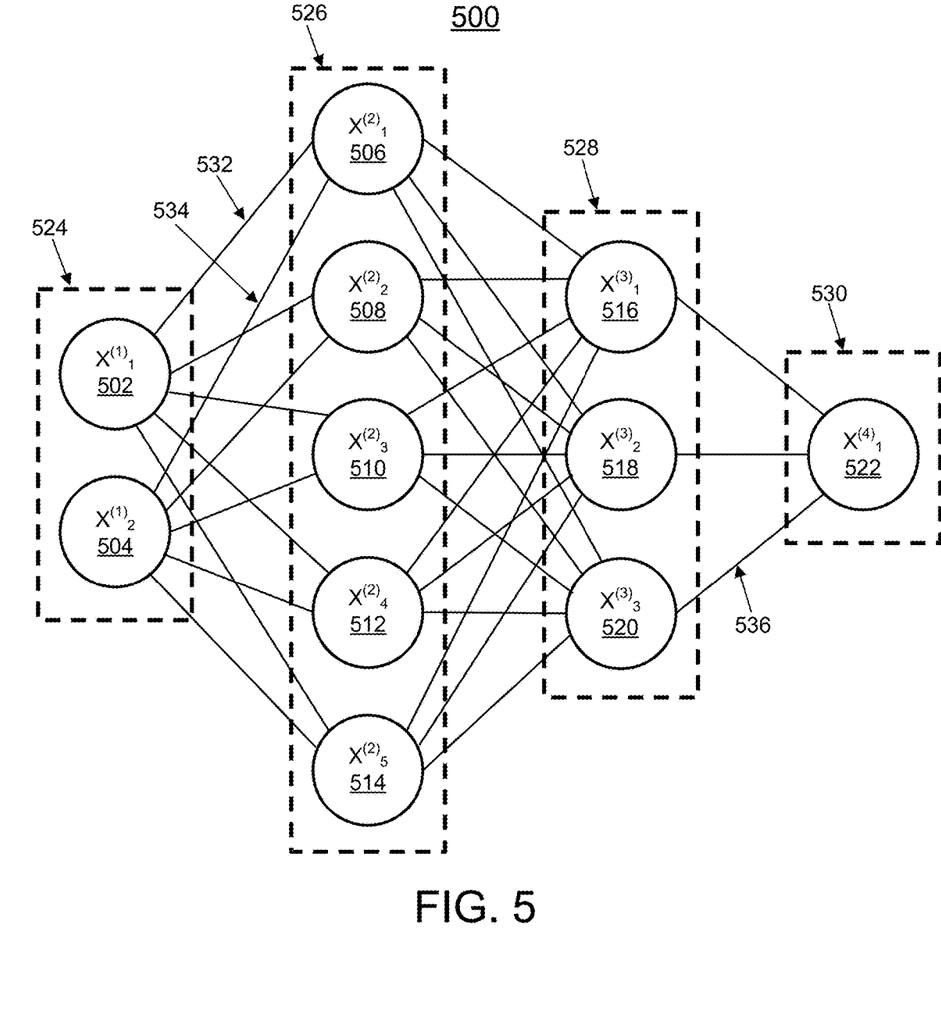
FIG. 5 shows an exemplary artificial neural network that may be used to implement one or more embodiments.

FIG. 5 shows an embodiment of an artificial neural network 500, in accordance with one or more embodiments. Alternative terms for "artificial neural network" are "neural network", "artificial neural net" or "neural net". Machine learning networks described herein, such as, e.g., the machine learning based networks utilized to perform steps 104, 106, and 108 of FIG. 1, the classifier 204 and the neural networks 206, 226, and 228 of FIG. 2, the encoder network 304 and decoder networks 308, 312, and 316 of FIG. 3, and the encoder network 404 and progression classification network 408, may be implemented using artificial neural network 500.

The artificial neural network 500 comprises nodes 502-522 and edges 532, 534, . . . , 536, wherein each edge 532, 534, . . . , 536 is a directed connection from a first node 502-522 to a second node 502-522. In general, the first node 502-522 and the second node 502-522 are different nodes 502-522, it is also possible that the first node 502-522 and the second node 502-522 are identical. For example, in FIG. 5, the edge 532 is a directed connection from the node 502 to the node 506, and the edge 534 is a directed connection from the node 504 to the node 506. An edge 532, 534, . . . , 536 from a first node 502-522 to a second node 502-522 is also denoted as "ingoing edge" for the second node 502-522 and as "outgoing edge" for the first node 502-522.

In this embodiment, the nodes 502-522 of the artificial neural network 500 can be arranged in layers 524-530, wherein the layers can comprise an intrinsic order introduced by the edges 532, 534, . . . , 536 between the nodes 502-522. In particular, edges 532, 534, . . . , 536 can exist only between neighboring layers of nodes. In the embodiment shown in FIG. 5, there is an input layer 524 comprising only nodes 502 and 504 without an incoming edge, an output layer 530 comprising only node 522 without outgoing edges, and hidden layers 526, 528 in-between the input layer 524 and the output layer 530. In general, the number of hidden layers 526, 528 can be chosen arbitrarily. The number of nodes 502 and 504 within the input layer 524 usually relates to the number of input values of the neural network 500, and the number of nodes 522 within the output layer 530 usually relates to the number of output values of the neural network 500.

In particular, a (real) number can be assigned as a value to every node 502-522 of the neural network 500. Here, $x^{(n)}_i$ denotes the value of the i-th node 502-522 of the n-th layer 524-530. The values of the nodes 502-522 of the input layer 524 are equivalent to the input values of the neural network 500, the value of the node 522 of the output layer 530 is equivalent to the output value of the neural network 500. Furthermore, each edge 532, 534, . . . , 536 can comprise a weight being a real number, in particular, the weight is a real number within the interval [−1, 1] or within the interval [0, 1]. Here, $w^{(m,n)}_{i,j}$ denotes the weight of the edge between the i-th node 502-522 of the m-th layer 524-530 and the j-th node 502-522 of the n-th layer 524-530. Furthermore, the abbreviation $w^{(n)}_{i,j}$ is defined for the weight $w^{(n,n+1)}_{i,j}$.

In particular, to calculate the output values of the neural network 500, the input values are propagated through the neural network. In particular, the values of the nodes 502-522 of the (n+1)-th layer 524-530 can be calculated based on the values of the nodes 502-522 of the n-th layer 524-530 by $$x_j^{(n+1)} = f(\Sigma_i x_i^{(n)} \cdot w_{i,j}^{(n)}).$$

Herein, the function f is a transfer function (another term is "activation function"). Known transfer functions are step functions, sigmoid function (e.g. the logistic function, the generalized logistic function, the hyperbolic tangent, the Arctangent function, the error function, the smoothstep function) or rectifier functions. The transfer function is mainly used for normalization purposes.

In particular, the values are propagated layer-wise through the neural network, wherein values of the input layer 524 are given by the input of the neural network 500, wherein values of the first hidden layer 526 can be calculated based on the values of the input layer 524 of the neural network, wherein values of the second hidden layer 528 can be calculated based in the values of the first hidden layer 526, etc.

In order to set the values $w^{(m,n)}_{i,j}$ for the edges, the neural network 500 has to be trained using training data. In particular, training data comprises training input data and training output data (denoted as $t_i$). For a training step, the neural network 500 is applied to the training input data to generate calculated output data. In particular, the training data and the calculated output data comprise a number of values, said number being equal with the number of nodes of the output layer.

In particular, a comparison between the calculated output data and the training data is used to recursively adapt the weights within the neural network 500 (backpropagation algorithm). In particular, the weights are changed according to $$w'^{(n)}_{i,j} = w^{(n)}_{i,j} - \gamma \cdot \delta_j^{(n)} \cdot x_i^{(n)}$$

wherein y is a learning rate, and the numbers $\delta^{(n)}_j$ can be recursively calculated as $$\delta_j^{(n)} = (\Sigma_k \delta_k^{(n+1)} \cdot w_{j,k}^{(n+1)}) \cdot f'(\Sigma_i x_i^{(n)} \cdot w_{i,j}^{(n)})$$

based on $\delta^{(n+1)}_j$, if the (n+1)-th layer is not the output layer, and $$\delta_j^{(n)} = (x_k^{(n+1)} - t_j^{(n+1)}) \cdot f'(\Sigma_i x_i^{(n)} \cdot w_{i,j}^{(n)})$$

if the (n+1)-th layer is the output layer 530, wherein f' is the first derivative of the activation function, and $y^{(n+1)}_j$ is the comparison training value for the j-th node of the output layer 530.

Figure 6:
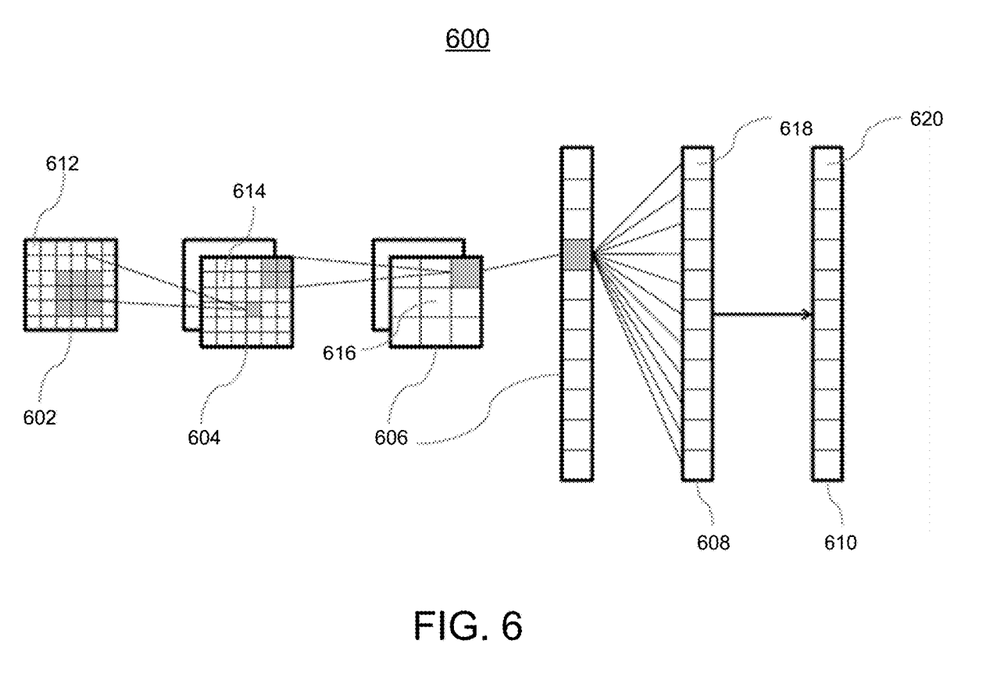
FIG. 6 shows a convolutional neural network that may be used to implement one or more embodiments.

FIG. 6 shows a convolutional neural network 600, in accordance with one or more embodiments. Machine learning networks described herein, such as, e.g., the machine learning based networks utilized to perform steps 104, 106, and 108 of FIG. 1, the classifier 204 and the neural networks 206, 226, and 228 of FIG. 2, the encoder network 304 and decoder networks 308, 312, and 316 of FIG. 3, and the encoder network 404 and progression classification network 408, may be implemented using convolutional neural network 600.

In the embodiment shown in FIG. 6, the convolutional neural network comprises 600 an input layer 602, a convolutional layer 604, a pooling layer 606, a fully connected layer 608, and an output layer 610. Alternatively, the convolutional neural network 600 can comprise several convolutional layers 604, several pooling layers 606, and several fully connected layers 608, as well as other types of layers. The order of the layers can be chosen arbitrarily, usually fully connected layers 608 are used as the last layers before the output layer 610.

In particular, within a convolutional neural network 600, the nodes 612-620 of one layer 602-610 can be considered to be arranged as a d-dimensional matrix or as a d-dimensional image. In particular, in the two-dimensional case the value of the node 612-620 indexed with i and j in the n-th layer 602-610 can be denoted as $x^{(n)}_{[i,j]}$. However, the arrangement of the nodes 612-620 of one layer 602-610 does not have an effect on the calculations executed within the convolutional neural network 600 as such, since these are given solely by the structure and the weights of the edges.

In particular, a convolutional layer 604 is characterized by the structure and the weights of the incoming edges forming a convolution operation based on a certain number of kernels. In particular, the structure and the weights of the incoming edges are chosen such that the values $x^{(n)}_k$ of the nodes 614 of the convolutional layer 604 are calculated as a convolution $x^{(n)}_k = K_k * x^{(n-1)}$ based on the values $x^{(n-1)}$ of the nodes 612 of the preceding layer 602, where the convolution * is defined in the two-dimensional case as $$x_k^{(n)}[i,j] = (K_k * x^{(n-1)})[i,j] = \Sigma_{i'} \Sigma_{j'} K_k[i',j'] \cdot x^{(n-1)}[i-i',j-j'].$$

Here the k-th kernel $K_k$ is a d-dimensional matrix (in this embodiment a two-dimensional matrix), which is usually small compared to the number of nodes 612-618 (e.g. a 3×3 matrix, or a 5×5 matrix). In particular, this implies that the weights of the incoming edges are not independent, but chosen such that they produce said convolution equation. In particular, for a kernel being a 3×3 matrix, there are only 9 independent weights (each entry of the kernel matrix corresponding to one independent weight), irrespectively of the number of nodes 612-620 in the respective layer 602-610. In particular, for a convolutional layer 604, the number of nodes 614 in the convolutional layer is equivalent to the number of nodes 612 in the preceding layer 602 multiplied with the number of kernels.

If the nodes 612 of the preceding layer 602 are arranged as a d-dimensional matrix, using a plurality of kernels can be interpreted as adding a further dimension (denoted as "depth" dimension), so that the nodes 614 of the convolutional layer 604 are arranged as a (d+1)-dimensional matrix. If the nodes 612 of the preceding layer 602 are already arranged as a (d+1)-dimensional matrix comprising a depth dimension, using a plurality of kernels can be interpreted as expanding along the depth dimension, so that the nodes 614 of the convolutional layer 604 are arranged also as a (d+1)-dimensional matrix, wherein the size of the (d+1)-dimensional matrix with respect to the depth dimension is by a factor of the number of kernels larger than in the preceding layer 602.

The advantage of using convolutional layers 604 is that spatially local correlation of the input data can exploited by enforcing a local connectivity pattern between nodes of adjacent layers, in particular by each node being connected to only a small region of the nodes of the preceding layer.

In embodiment shown in FIG. 6, the input layer 602 comprises 36 nodes 612, arranged as a two-dimensional 6×6 matrix. The convolutional layer 604 comprises 72 nodes 614, arranged as two two-dimensional 6×6 matrices, each of the two matrices being the result of a convolution of the values of the input layer with a kernel. Equivalently, the nodes 614 of the convolutional layer 604 can be interpreted as arranges as a three-dimensional 6×6×2 matrix, wherein the last dimension is the depth dimension.

A pooling layer 606 can be characterized by the structure and the weights of the incoming edges and the activation function of its nodes 616 forming a pooling operation based on a non-linear pooling function f. For example, in the two dimensional case the values $x^{(n)}$ of the nodes 616 of the pooling layer 606 can be calculated based on the values $x^{(n-1)}$ of the nodes 614 of the preceding layer 604 as $$x^{(n)}[i,j] = f(x^{(n-1)}[id_1, jd_2], \ldots, x^{(n-1)}[id_1+d_1-1, jd_2+d_2-1])$$

In other words, by using a pooling layer 606, the number of nodes 614, 616 can be reduced, by replacing a number d1·d2 of neighboring nodes 614 in the preceding layer 604 with a single node 616 being calculated as a function of the values of said number of neighboring nodes in the pooling layer. In particular, the pooling function f can be the max-function, the average or the L2-Norm. In particular, for a pooling layer 606 the weights of the incoming edges are fixed and are not modified by training.

The advantage of using a pooling layer 606 is that the number of nodes 614, 616 and the number of parameters is reduced. This leads to the amount of computation in the network being reduced and to a control of overfitting.

In the embodiment shown in FIG. 6, the pooling layer 606 is a max-pooling, replacing four neighboring nodes with only one node, the value being the maximum of the values of the four neighboring nodes. The max-pooling is applied to each d-dimensional matrix of the previous layer; in this embodiment, the max-pooling is applied to each of the two two-dimensional matrices, reducing the number of nodes from 72 to 18.

A fully-connected layer 608 can be characterized by the fact that a majority, in particular, all edges between nodes 616 of the previous layer 606 and the nodes 618 of the fully-connected layer 608 are present, and wherein the weight of each of the edges can be adjusted individually.

In this embodiment, the nodes 616 of the preceding layer 606 of the fully-connected layer 608 are displayed both as two-dimensional matrices, and additionally as non-related nodes (indicated as a line of nodes, wherein the number of nodes was reduced for a better presentability). In this embodiment, the number of nodes 618 in the fully connected layer 608 is equal to the number of nodes 616 in the preceding layer 606. Alternatively, the number of nodes 616, 618 can differ.

Furthermore, in this embodiment, the values of the nodes 620 of the output layer 610 are determined by applying the Softmax function onto the values of the nodes 618 of the preceding layer 608. By applying the Softmax function, the sum the values of all nodes 620 of the output layer 610 is 1, and all values of all nodes 620 of the output layer are real numbers between 0 and 1.

A convolutional neural network 600 can also comprise a ReLU (rectified linear units) layer or activation layers with non-linear transfer functions. In particular, the number of nodes and the structure of the nodes contained in a ReLU layer is equivalent to the number of nodes and the structure of the nodes contained in the preceding layer. In particular, the value of each node in the ReLU layer is calculated by applying a rectifying function to the value of the corresponding node of the preceding layer.

The input and output of different convolutional neural network blocks can be wired using summation (residual/dense neural networks), element-wise multiplication (attention) or other differentiable operators. Therefore, the convolutional neural network architecture can be nested rather than being sequential if the whole pipeline is differentiable.

In particular, convolutional neural networks 600 can be trained based on the backpropagation algorithm. For preventing overfitting, methods of regularization can be used, e.g. dropout of nodes 612-620, stochastic pooling, use of artificial data, weight decay based on the L1 or the L2 norm, or max norm constraints. Different loss functions can be combined for training the same neural network to reflect the joint training objectives. A subset of the neural network parameters can be excluded from optimization to retain the weights pretrained on another datasets.

Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions of FIGS. 1-4. Certain steps or functions of the methods and workflows described herein, including one or more of the steps or functions of FIGS. 1-4, may be performed by a server or by another processor in a network-based cloud-computing system. Certain steps or functions of the methods and workflows described herein, including one or more of the steps of FIGS. 1-4, may be performed by a client computer in a network-based cloud computing system. The steps or functions of the methods and workflows described herein, including one or more of the steps of FIGS. 1-4, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions of FIGS. 1-4, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 7:
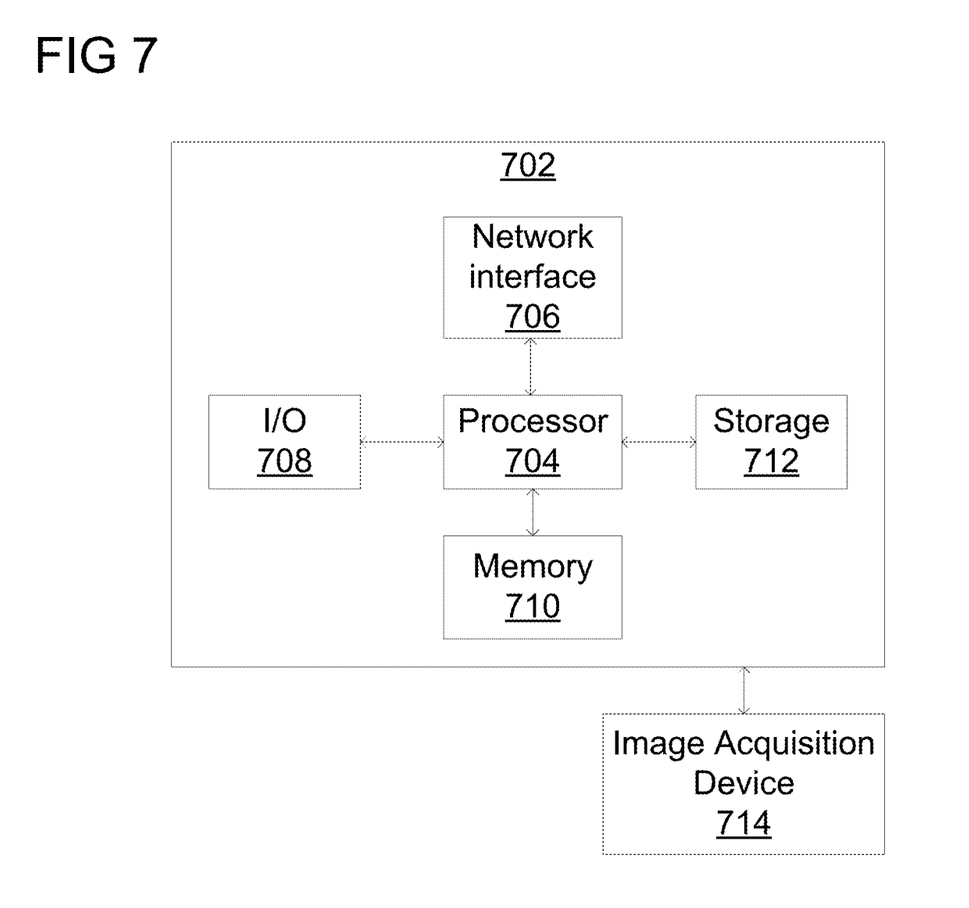
FIG. 7 shows a high-level block diagram of a computer that may be used to implement one or more embodiments.

A high-level block diagram of an example computer 702 that may be used to implement systems, apparatus, and methods described herein is depicted in FIG. 7. Computer 702 includes a processor 704 operatively coupled to a data storage device 712 and a memory 710. Processor 704 controls the overall operation of computer 702 by executing computer program instructions that define such operations. The computer program instructions may be stored in data storage device 712, or other computer readable medium, and loaded into memory 710 when execution of the computer program instructions is desired. Thus, the method and workflow steps or functions of FIGS. 1-4 can be defined by the computer program instructions stored in memory 710 and/or data storage device 712 and controlled by processor 704 executing the computer program instructions. For example, the computer program instructions can be implemented as computer executable code programmed by one skilled in the art to perform the method and workflow steps or functions of FIGS. 1-4. Accordingly, by executing the computer program instructions, the processor 704 executes the method and workflow steps or functions of FIGS. 1-4. Computer 702 may also include one or more network interfaces 706 for communicating with other devices via a network. Computer 702 may also include one or more input/output devices 708 that enable user interaction with computer 702 (e.g., display, keyboard, mouse, speakers, buttons, etc.).

Processor 704 may include both general and special purpose microprocessors, and may be the sole processor or one of multiple processors of computer 702. Processor 704 may include one or more central processing units (CPUs), for example. Processor 704, data storage device 712, and/or memory 710 may include, be supplemented by, or incorporated in, one or more application-specific integrated circuits (ASICs) and/or one or more field programmable gate arrays (FPGAs).

Data storage device 712 and memory 710 each include a tangible non-transitory computer readable storage medium. Data storage device 712, and memory 710, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 708 may include peripherals, such as a printer, scanner, display screen, etc. For example, input/ output devices 708 may include a display device such as a cathode ray tube (CRT) or liquid crystal display (LCD) monitor for displaying information to the user, a keyboard, and a pointing device such as a mouse or a trackball by which the user can provide input to computer 702.

An image acquisition device 714 can be connected to the computer 702 to input image data (e.g., medical images) to the computer 702. It is possible to implement the image acquisition device 714 and the computer 702 as one device. It is also possible that the image acquisition device 714 and the computer 702 communicate wirelessly through a network. In a possible embodiment, the computer 702 can be located remotely with respect to the image acquisition device 714.

Any or all of the systems and apparatus discussed herein may be implemented using one or more computers such as computer 702.

One skilled in the art will recognize that an implementation of an actual computer or computer system may have other structures and may contain other components as well, and that FIG. 7 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method comprising:
receiving an input medical image of a tumor of a patient;
segmenting the tumor from the input medical image using a machine learning architecture;
performing one or more assessments of the tumor by:
performing a volumetric analysis of the tumor by computing a volume of the segmented tumor, and
performing a radiomic analysis of the tumor by extracting radiomic features of the tumor from the input medical image using the machine learning architecture and correlating the radiomic features in a radiomic feature correlation matrix;
predicting clinical outcomes of the patient by:
combining the volume of the segmented tumor and the radiomic feature correlation matrix with historical clinical data of the patient,
predicting a volumetric-based clinical outcome of the patient based on the volume of the segmented tumor combined with the historical clinical data using a first neural network of the machine learning architecture, and
predicting a radiomic-based clinical outcome of the patient based on the radiomic feature correlation matrix combined with the historical clinical data using a second neural network of the machine learning architecture; and
outputting the clinical outcomes of the patient,
wherein the machine learning architecture comprises: an encoder network for extracting features from the input medical image and a first decoder network, a second decoder network, the first neural network, and the second neural network each for decoding the same extracted features to respectively perform the segmenting of the tumor, the extracting of the radiomic features, the predicting of the volumetric-based clinical outcome of the patient, and the predicting of the radiomic-based clinical outcome of the patient.

2. The method of claim 1, wherein the radiomic features comprise one or more of tumor intensity, tumor shape, or tumor texture.

3. The method of claim 1, wherein predicting clinical outcomes of the patient comprises:
predicting one or more of a response to a treatment of the tumor or a survival prognosis of the patient.

4. The method of claim 1, wherein the encoder network encodes the input medical image into latent features representing tumor and normal tissue in the input medical image, the first decoder network decodes the latent features to generate a segmentation map of the tumor, the second decoder network decodes the latent features to extract the radiomic features of the tumor, and the first and second neural network decodes the latent features to predict the clinical outcome.

5. The method of claim 1, further comprising:
receiving one or more additional input medical images of the patient, the input medical image and the one or more additional input medical images acquired at different timepoints;
encoding the input medical image and the one or more additional input medical images into latent features using the encoder network; and
determining an assessment of tumor progression based on the latent features using a machine learning based progression classification network.

6. The method of claim 1, wherein the input medical image comprises an mpMRI (multi-parametric magnetic resonance imaging) image of a brain of the patient.

7. An apparatus comprising:
means for receiving an input medical image of a tumor of a patient;
means for segmenting the tumor from the input medical image using a machine learning architecture;
means for performing one or more assessments of the tumor by:
performing a volumetric analysis of the tumor by computing a volume of the segmented tumor, and
performing a radiomic analysis of the tumor by extracting radiomic features of the tumor from the input medical image using the machine learning architecture and correlating the radiomic features in a radiomic feature correlation matrix;
means for predicting clinical outcomes of the patient by:
combining the volume of the segmented tumor and the radiomic feature correlation matrix with historical clinical data of the patient,
predicting a volumetric-based clinical outcome of the patient based on the volume of the segmented tumor combined with the historical clinical data using a first neural network of the machine learning architecture, and
predicting a radiomic-based clinical outcome of the patient based on the radiomic feature correlation matrix combined with the historical clinical data using a second neural network of the machine learning architecture; and
means for outputting the clinical outcome of the patient,
wherein the machine learning architecture comprises: an encoder network for extracting features from the input medical image and a first decoder network, a second decoder network, the first neural network, and the second neural network each for decoding the same extracted features to respectively perform the segmenting of the tumor, the extracting of the radiomic features, the predicting of the volumetric-based clinical outcome of the patient, and the predicting of the radiomic-based clinical outcome of the patient.

8. The apparatus of claim 7, wherein the radiomic features comprise one or more of tumor intensity, tumor shape, or tumor texture.

9. The apparatus of claim 7, wherein the means for predicting clinical outcomes of the patient comprises:
   means for predicting one or more of a response to a treatment of the tumor or a survival prognosis of the patient.

10. The apparatus of claim 7, wherein the encoder network encodes the input medical image into latent features representing tumor and normal tissue in the input medical image, the first decoder network decodes the latent features to generate a segmentation map of the tumor, the second decoder network decodes the latent features to extract the radiomic features of the tumor, and the first and second neural network decodes the latent features to predict the clinical outcome.

11. A non-transitory computer readable medium storing computer program instructions, the computer program instructions when executed by a processor cause the processor to perform operations comprising:
   receiving an input medical image of a tumor of a patient;
   segmenting the tumor from the input medical image using a machine learning architecture;
   performing one or more assessments of the tumor by:
      performing a volumetric analysis of the tumor by computing a volume of the segmented tumor, and
      performing a radiomic analysis of the tumor by extracting radiomic features of the tumor from the input medical image using the machine learning architecture and correlating the radiomic features in a radiomic feature correlation matrix;
   predicting clinical outcomes of the patient by:
      combining the volume of the segmented tumor and the radiomic feature correlation matrix with historical clinical data of the patient,
      predicting a volumetric-based clinical outcome of the patient based on the volume of the segmented tumor combined with the historical clinical data using a first neural network of the machine learning architecture, and
      predicting a radiomic-based clinical outcome of the patient based on the radiomic feature correlation matrix combined with the historical clinical data using a second neural network of the machine learning architecture; and
   outputting the clinical outcomes of the patient,
   wherein the machine learning architecture comprises: an encoder network for extracting features from the input medical image and a first decoder network, a second decoder network, the first neural network, and the second neural network each for decoding the same extracted features to respectively perform the segmenting of the tumor, the extracting of the radiomic features, the predicting of the volumetric-based clinical outcome of the patient, and the predicting of the radiomic-based clinical outcome of the patient.

12. The non-transitory computer readable medium of claim 11, wherein predicting clinical outcomes of the patient comprises:
   predicting one or more of a response to a treatment of the tumor or a survival prognosis of the patient.

13. The non-transitory computer readable medium of claim 11, wherein the encoder network encodes the input medical image into latent features representing tumor and normal tissue in the input medical image, the first decoder decodes the latent features to generate a segmentation map of the tumor, the second decoder decodes the latent features to extract the radiomic features of the tumor, and the first and second neural network decodes the latent features to predict the clinical outcome.

14. The non-transitory computer readable medium of claim 11, the operations further comprising:
   receiving one or more additional input medical images of the patient, the input medical image and the one or more additional input medical images acquired at different timepoints;
   encoding the input medical image and the one or more additional input medical images into latent features using the encoder network; and
   determining an assessment of tumor progression based on the latent features using a machine learning based progression classification network.

15. The non-transitory computer readable medium of claim 11, wherein the input medical image comprises an mpMRI (multi-parametric magnetic resonance imaging) image of a brain of the patient.

* * * * *